United States Patent Office.

CHARLES HENRY WHITTEMORE, OF LEWISTON, MAINE.

Letters Patent No. 81,122, dated August 18, 1868.

IMPROVED MEDICAL COMPOUND.

*The Schedule referred to in these Letters Patent and making part of the same.*

TO ALL PERSONS TO WHOM THESE PRESENTS MAY COME:

Be it known that I, CHARLES HENRY WHITTEMORE, of Lewiston, in the county of Androscoggin, and State of Maine, have invented a new and useful Composition or Liniment for the Cure or Alleviation of Rheumatism and various other diseases of the human system; and I do hereby declare the same to be fully described, as follows:

The said composition is composed of the following constituents, in the proportions as hereinafter stated; that is to say, in making it, I take one gallon of essential oil of turpentine, one gallon of linseed-oil, two pounds of saleratus, four ounces of the tincture of lobelia, and two ounces of the tincture of balm of Gilead.

These materials are to be put in a vessel and thoroughly mixed together. The mixture or composition will then be fit to use, it being employed by rubbing it or applying it as a liniment on the diseased limb or place.

The essential oil has very penetrative qualities. The linseed-oil is emollient, and operates to prevent injury to the skin by the turpentine. The saleratus has curative and cleansing properties, especially when combined with the oil. It renders the composition peculiarly detersive. The lobelia has its usual effects as a curative and sedative; and the tincture of the balm of Gilead operates to strengthen the parts and restore them to their normal state.

The whole has been found to possess great curative properties, and to produce astonishing results, particularly in the relief and cure of rheumatic or nervous affections.

I do not confine my invention to the precise proportions of its ingredients as hereinbefore named, as they may be materially varied, and still be productive of good results.

I claim the combination of the three ingredients herein first named, also their combination with either or both of the others.

CHARLES H. WHITTEMORE.

Witnesses:
R. H. EDDY,
F. P. HALE, Jr.